US007014534B2

(12) United States Patent
Oshima et al.

(10) Patent No.: US 7,014,534 B2
(45) Date of Patent: Mar. 21, 2006

(54) METHOD FOR MANUFACTURING SUBSTRATE

(75) Inventors: Yoshiaki Oshima, Wakayama (JP);
Kazuhiko Nishimoto, Wakayama (JP);
Kenichi Suenaga, Wakayama (JP);
Toshiya Hagihara, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/857,841

(22) Filed: Jun. 2, 2004

(65) Prior Publication Data
US 2004/0266323 A1 Dec. 30, 2004

(30) Foreign Application Priority Data
Jun. 9, 2003 (JP) ............................. 2003-164322
Jun. 9, 2003 (JP) ............................. 2003-164329

(51) Int. Cl.
B24B 1/00 (2006.01)
(52) U.S. Cl. .................. 451/41; 451/60; 451/36
(58) Field of Classification Search ............... 451/41, 451/60, 36, 59; 438/692, 693
See application file for complete search history.

(56) References Cited

U.S. PATENT DOCUMENTS

| 5,628,862 | A |   | 5/1997  | Yu et al.       |
|-----------|----|---|---------|-----------------|
| 6,126,532 | A  | * | 10/2000 | Sevilla et al. ........... 451/526 |
| 6,149,696 | A  |   | 11/2000 | Jia             |
| 6,426,155 | B1 |   | 7/2002  | Tada et al.     |
| 6,439,965 | B1 |   | 8/2002  | Ichino et al.   |
| 6,477,926 | B1 |   | 11/2002 | Swisher et al.  |
| 6,551,175 | B1 |   | 4/2003  | Koichi et al.   |
| 6,719,819 | B1 |   | 4/2004  | Ota et al.      |
| 2002/0173259 | A1 |   | 11/2002 | Drury        |
| 2003/0217517 | A1 | * | 11/2003 | Allison et al. ............ 51/298 |
| 2003/0220061 | A1 | * | 11/2003 | Prasad ................ 451/526 |

FOREIGN PATENT DOCUMENTS

JP 2000-343411 A 12/2000
WO WO00/02708 A1 1/2000

OTHER PUBLICATIONS

English language abstract of JP 2002-30274 (Jan. 31, 2002).
English language abstract of JP 2002-323254 (Nov. 22, 2001).
English language abstract of JP 2001-62704 (Mar. 13, 2001).
English language abstract of JP 9-204657 (Aug. 5, 1997).
English language abstract of JP 11-167715 (Jun. 22, 1999).
English language abstract of JP 11-246849 (Sep. 14, 1999).

* cited by examiner

*Primary Examiner*—Dung Van Nguyen
(74) *Attorney, Agent, or Firm*—Birch, Stewart, Kolasch & Birch, LLP

(57) ABSTRACT

A method for manufacturing a substrate, a polishing process for a substrate, a method of reducing microwaviness for a substrate, each including the step of polishing a substrate to be polished with a polishing composition containing an abrasive and water with a polishing pad of which surface member has an average pore size of from 1 to 35 $\mu$m; and a method of reducing scratches for a substrate, comprising the step of polishing a substrate to be polished with a polishing composition comprising an abrasive, an oxidizing agent, an acid, a salt thereof, or a mixture thereof and water, with a polishing pad of which surface member has an average pore size of from 1 to 35 $\mu$m. The method for manufacturing a substrate can be used for finish polishing of a memory hard disk or for polishing of a semiconductor element.

21 Claims, 2 Drawing Sheets

METHOD FOR MANUFACTURING SUBSTRATE

This Nonprovisional application claims priority under 35 U.S.C. § 119(a) on Patent Application No(s). 2003-164322 and 2003-164329 filed in Japan on Jun. 9, 2003, the entire contents of which are hereby incorporated by reference.

FIELD OF THE INVENTION

The present invention relates to a method for manufacturing a substrate, a polishing process, a method of reducing microwaviness, and a method of reducing scratches, each in which a substrate to be polished is polished with a polishing composition with a polishing pad.

BACKGROUND OF THE INVENTION

In recent memory hard disk drives, high storage capacity and miniaturization have been demanded. In order to increase the recording density, it has been strongly urged to lower flying height of a magnetic head and to reduce the unit recording area. Along with this trend, the surface qualities required after polishing have become severely assessed every year even in a process for manufacturing a substrate for a magnetic disk. In order to satisfy the lowering of flying height of the magnetic head, the surface roughness, the microwaviness, the roll-off and projections are reduced, and in order to satisfy the reduction in unit recording area, the sizes and depths of the scratches and pits allowed have become increasing smaller.

In order to meet such requirements, there has been known a polishing composition for an aluminum disk substrate, containing colloidal silica particles having different monomodal number particle size distributions, whereby an aluminum disk substrate having a smaller average waviness and fewer surface defects can be obtained (see, for instance, Japanese Patent Laid-Open No. 2002-30274).

In addition, there has been known a polishing composition containing colloidal silicas having a specified particle size distribution, which has excellent surface smoothness, whereby polishing can be carried out at an economical rate without generating surface defects (see, for instance, Japanese Patent Laid-Open No. 2001-323254).

However, with the increase in improvements in the recording densities over the years, since the flying height of the magnetic head must be lowered, the specification for microwaviness desired for a substrate is becoming increasingly stricter. Therefore, in the conventional combinations of the polishing composition with the conventional polishing pad described in the above-mentioned Japanese Patent Laid-Open Nos. 2002-30274 and 2001-323254, the quality of the substrate cannot be achieved.

In addition, Japanese Patent Laid-Open No. 2001-62704 discloses a method of reducing microwaviness using a pad without pores on the surface of the polishing pad. In this method, there arises a problem such as the polishing rate is delayed because the polishing liquid is not sufficiently retained in the polishing pad.

On the other hand, in the field of semiconductors, the trends of producing thinner wiring have been progressed along with the trends of highly integrated circuits and higher speed at the operating frequencies. Even in the method for manufacturing a semiconductor device, since the focal depth becomes shallow with the trend of thinning the wiring during the exposure of a photoresist, further smoothening of a pattern-forming surface has been desired.

In order to meet such requirements, there have been proposed polishing compositions with improved surface qualities such as surface roughness Ra and Rmax, scratches, pits and projections (Japanese Patent Laid-Open Nos. Hei 9-204657, Hei 11-167715 and Hei 11-246849). With the increase in improved recording densities over the years, the chamfer in the texture step, which is a after treatment step, is reduced, so that the allowable level of scratches after the polishing step of the substrate has becoming increasingly stricter. Therefore, in the conventional combinations of the polishing composition with the polishing pad, the scratches cannot be sufficiently removed, so that a desired quality cannot be achieved.

SUMMARY OF THE INVENTION

The present invention relates to the followings:

(1) a method for manufacturing a substrate, including the step of polishing a substrate to be polished with a polishing composition containing an abrasive and water with a polishing pad of which surface member has an average pore size of from 1 to 35 μm;

(2) a polishing process for a substrate, including the step of polishing a substrate to be polished with a polishing composition containing an abrasive and water with a polishing pad of which surface member has an average pore size of from 1 to 35 μm;

(3) a method of reducing microwaviness for a substrate, including the step of polishing a substrate to be polished with a polishing composition containing an abrasive and water with a polishing pad of which surface member has an average pore size of from 1 to 35 μm; and (4) a method of reducing scratches for a substrate, including the step of polishing a substrate to be polished with a polishing composition containing:
an abrasive,
an oxidizing agent,
an acid, a salt thereof, or a mixture thereof
and water, with a polishing pad of which surface member has an average pore size of from 1 to 35 μm.

DETAILED DESCRIPTION OF THE INVENTION

Figure 1:
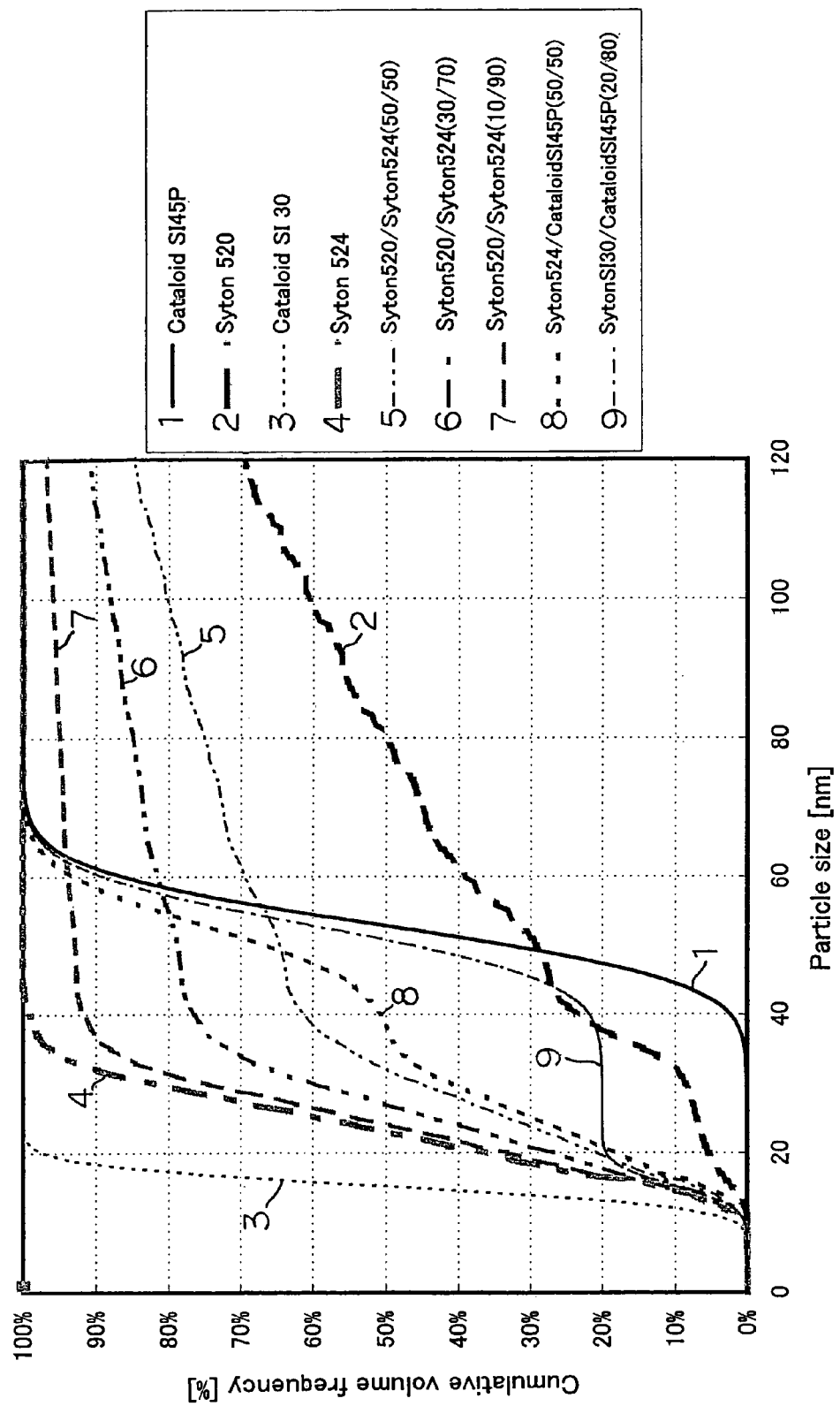
FIG. 1 is a graph for particle size-cumulative volume frequency of abrasive particles used in each Example.

The present invention relates to a method for manufacturing a substrate, a polishing process, a method of reducing microwaviness, and a method of reducing scratches, each of which is capable of reducing microwaviness of a polished object used for finish polishing of a memory hard disk or for polishing of a semiconductor element.

Also, the present invention relates to a method for manufacturing a substrate, a polishing process, a method of reducing microwaviness, and a method of reducing scratches, which is used for finish polishing of a memory hard disk or for polishing of a semiconductor element, each of which gives a polished object with reduced surface roughness and remarkable reduction in projections and scratches, especially reduction in nano scratches as observed with Micromax and broad scratches having a depth as shallow as 5 nm or less and width of 10 to 50 μm, whereby polishing can be efficiently carried out.

These and other advantages of the present invention will be apparent from the following description.

One of the features of the method for manufacturing a substrate of the present invention resides in that the method includes the step of polishing a substrate to be polished with a polishing composition comprising water and abrasives, with a polishing pad of which surface member has an average pore size of 1 to 35 μm. In the present invention, by using the above-mentioned polishing composition and the polishing pad, an effect such as the microwaviness of a polished substrate can be remarkably reduced is exhibited.

Especially, in the present invention, since the polishing composition can be appropriately retained on the polishing pad with the above-mentioned polishing pad having a specified surface member, an effect such that the microwaviness of the polished object is reduced, so that a high-quality memory hard disk and a semiconductor element can be manufactured while keeping a high polishing rate is exhibited.

The polishing pad which has been conventionally used has relatively large pores having an average pore size of from about 40 to about 80 μm on the surface of the pad. Therefore, when the polishing pad is used, the effect of reducing microwaviness has not been satisfactory.

The term "microwaviness" as used herein refers to dents and projections of a surface having an intermediary wavelength between roughness and waviness, which is classified into short-wavelength waviness (waviness having a wavelength of from 50 to 500 μm) and long-wavelength waviness (waviness having a wavelength of from 500 μm to 5 mm).

Specifically, the microwaviness can serve as an index showing the surface smoothness of a polished object, which affects a flying height of a magnetic head. Therefore, the smaller the microwaviness, the more excellent the surface smoothness of the polished object, so that the flying height of the magnetic head can be lowered.

Generally, the microwaviness of a surface of a polished object is determined as an average of each of parts, which are picked up randomly from the surface of the polished object. The microwaviness is not even in individual positions of the surface of the object and usually shows a considerably large variance. Therefore, in order to obtain the microwaviness of the surface of the object, the measurement positions and the number of measurements must be determined, so that the population mean can be effectively deduced. Hence, the reliability of the data greatly depends on the selection of the measurement positions and the number of measurements.

The details of the method for determining the microwaviness in the present invention will be described in Examples set forth below.

As to the polishing pad usable in the present invention, its structure is not particularly limited, as long as the surface member has pores having an average pore size of from 1 to 35 μm. The polishing pad includes, for instance, those made from suede, nonwoven fabric, polyurethane foam alone, and a double layered structure in which any one of these are laminated as described in "*CMP Gijutu Kiso Jitsurei Koza Shiriizu II—Mekanokemikaru Porisshing (CMP) no Kiso to Jitsurei* (Lecture Series II on Fundamentals and Application Examples on CMP Techniques, Fundamentals and Application Examples of Mechanochemical-Polishing)" (May 27, 1998) (Polishing Pad Edition), "*Science of CMP*," Chapter 4 (Edit. by Masahiro Kashiwagi, K.K. Science Forum), and the suede type is preferable, from the viewpoint of reducing surface roughness, microwaviness and micro-scratches and broad scratches, which are surface defects. The suede type as used herein refers to a polishing pad having a structure containing a base layer (a layer which is beneath a surface layer and supports the surface layer) and a foamed surface layer. As the material of the base layer, a high-hardness resin such as polyethylene terephthalate (PET) is preferable. In addition, as the material of the surface layer, polyurethane is preferable. Examples of the polishing pad of suede type include, but not limited to, for instance, those described in Japanese Patent Laid-Open Nos. Hei 11-335979 and 2001-62704.

The surface member of the polishing pad has an average pore size of 35 μm or less, preferably 30 μm or less, more preferably 27 μm or less, even more preferably 25 μm or less, from the viewpoint of reducing scratches and/or microwaviness. The surface member has an average pore size of 1 μm or more, preferably 2 μm or more, more preferably 3 μm or more, from the viewpoint of retaining a polishing composition on the polishing pad so as not to run out of the polishing composition, i.e. the viewpoint of retaining property of the polishing composition on the pad. Also, the polishing pad has a maximum pore size of preferably 100 μm or less, more preferably 70 μm or less, even more preferably from 60 μm or less, even more preferably 50 μm or less, from the viewpoint of reducing scratches and/or microwaviness.

The pore size of the polishing pad can be adjusted by scraping the surface, for instance, by polishing the material for a pad containing pores. The polishing process including the step of carrying out polishing with fixed abrasive grains is preferable, from the viewpoint of preventing residual abrasive grains on the pad material.

Additionally, the polishing composition used in the present invention is the polishing composition comprising abrasive and water, and as the abrasive, the abrasives that are generally used for polishing can be used. The abrasive includes metals; carbides of metals or metalloids, nitrides of metals or metalloids, oxides of metals or metalloids or borides of metals or metalloids; diamond, and the like. The elements for metals or metalloids include those elements belonging to the Group 2A, 2B, 3A, 3B, 4A, 4B, 5A, 6A, 7A or 8 of the Periodic Table (long period form). Concrete examples of the abrasives include aluminum oxide, silicon carbide, diamond, magnesium oxide, zinc oxide, titanium oxide, cerium oxide, zirconium oxide, silica and the like. It is preferable to use one or more kinds of these abrasives from the viewpoint of increasing the polishing rate. Among them, aluminum oxide, silica, cerium oxide, zirconium oxide and titanium oxide are suitable for polishing a semiconductor wafer, a semiconductor element and a substrate of precision parts, such as a substrate for magnetic recording media. As to aluminum oxide, various crystal systems such as α, θ and γ are known, and they can properly be used and selected as occasion demands. Among these, silica, even more preferably colloidal silica is suitable for the application of a final polishing of the substrate for high-density recording memory magnetic disk that is required to have an even higher level of smoothness, or for the application of polishing semiconductor device substrate.

In addition, in the present invention, it is more preferable to use silica as the abrasive, from the viewpoints of reducing surface roughness (Ra, Rmax) and microwaviness (Wa), and reducing surface defects such as scratches, thereby improving surface qualities. The silica includes colloidal silica, fumed silica, surface-modified silica, and the like. Among them, colloidal silica is preferable. The colloidal silica can be obtained by the method for preparing from an aqueous silicic acid and the like.

It is preferable that the abrasive contains particles having particle sizes of from 5 to 120 nm in an amount of 50% by volume or more of the entire amount of the abrasive, wherein the abrasive contains:

(i) 10 to 100% by volume of small size particles having particle sizes of from 5 nm or more and less than 40 nm based on an entire amount of the abrasive particles having particle sizes of from 5 to 120 nm;

(ii) 0 to 70% by volume of intermediate size particles having particle sizes of from 40 nm or more and less than 80 nm based on an entire amount of the abrasive particles having particle sizes of from 5 to 120 nm;

(iii) 0 to 40% by volume of large size particles having particle sizes of from 80 nm or more and less than 120 nm based on an entire amount of the abrasive particles having particle sizes of from 5 to 120 nm; from the viewpoints of reducing surface roughness (Ra, Rmax) and microwaviness, reducing micropits and reducing scratches.

It is preferable that the abrasive contains particles having particle sizes of from 5 to 120 nm in an amount of 50% by volume or more of the entire amount of the abrasive, wherein the abrasive contains:

(i) 10 to 70% by volume of small size particles having particle sizes of from 5 nm or more and less than 40 nm based on an entire amount of the abrasive particles having particle sizes of from 5 to 120 nm;

(ii) 20 to 70% by volume of intermediate size particles having particle sizes of from 40 nm or more and less than 80 nm based on an entire amount of the abrasive particles having particle sizes of from 5 to 120 nm;

(iii) 0.1 to 40% by volume of large size particles having particle sizes of from 80 nm or more and less than 120 nm based on an entire amount of the abrasive particles having particle sizes of from 5 to 120 nm; from the viewpoint of reducing micropits.

The term "micropits" as referred to herein refers to (1) a pit which can be observed only in a state where the surface of a substrate is sufficiently planarized, when observed with a differential interference optical microscope at a magnification of from 50 to 100 times; or (2) a pit which can be observed as an inverted cone shape having a diameter of from 0.2 to 5 μm and a depth of from 10 to 100 nm, when observed with an atomic force microscope, wherein (3) Al element is detected at bottom of the pit. The detection of Al elements can be confirmed by combining a scanning electron microscope (SEM) and elementary analysis technique (EDS: energy-dispersive X-ray spectroscopy, and Auger electron spectroscopy).

It is thought that the micropits are generated for the following reasons. As the average particle size of the abrasive becomes smaller, the mechanical polishing power becomes deficient, so that the residuals such as stuck alumina abrasive grains in a previous process are less likely to be discharged, and the places where the residuals are stuck and discharged in a later process are not polished but remain as dents to generate micropits.

It is preferable that the abrasive usable in the present invention contains particles having particle sizes of from 5 to 120 nm in an amount of 50% by volume or more. The content of the above-mentioned particles having particle sizes of from 5 to 120 nm is preferably 55% by volume or more, more preferably 60% by volume or more, from the viewpoint of reducing micropits, surface roughness and scratches.

The content of the above-mentioned small size particles is preferably from 12 to 68% by volume, more preferably from 15 to 65% by volume, even more preferably from 20 to 60% by volume, even more preferably from 30 to 60% by volume, the content of the intermediate size particles is preferably from 25 to 70% by volume, more preferably from 25 to 60% by volume, even more preferably from 30 to 50% by volume, and the content of the large size particles is preferably from 0.5 to 35% by volume, more preferably from 1 to 30% by volume, from the viewpoint of reducing micropits.

Among them, it is desired that the abrasive usable in the present invention contains:

(i) 5 to 70% by volume, preferably from 10 to 50% by volume, of particles having particle sizes of from 10 to 30 nm based on an entire amount of the abrasive particles having particle sizes of from 5 to 120 nm;

(ii) 20 to 70% by volume, preferably from 22 to 65% by volume, of particles having particle sizes of from 45 to 75 nm based on an entire amount of the abrasive particles having particle sizes of from 5 to 120 nm; and (iii) 0.1 to 25% by volume, preferably from 1 to 15% by volume, of particles having particle sizes of from 90 to 110 nm based on an entire amount of the abrasive particles having particle sizes of from 5 to 120 nm, from the viewpoint of reducing micropits.

The particle size distribution of the above-mentioned abrasive is determined by the method described below. Specifically, the photographs of the abrasive particles observed by a transmission electron microscope (TEM) "JEM-2000 FX" commercially available from JEOL LTD. (80 kV, magnification: 10000 to 50000) are incorporated into a personal computer as image data with a scanner connected thereto. The projected area diameter of each particle is determined using an analysis software "WinROOF" (commercially available from MITANI CORPORATION), and considered as the diameter of the particles. After analyzing data for 1000 or more particles, the volume of the particles are calculated from the diameters of the particles based on the analyzed data using a spreadsheet software "EXCEL" (commercially available from Microsoft Corporation). First, the ratio (% based volume) of the particles having particle sizes of equal to or greater than 5 nm and equal to or less than 120 nm (simply referred to as particle sizes of from 5 to 120 nm) is calculated, and the ratios (% based volume) of three regions, namely a region of equal to or greater than 5 nm and less than 40 nm (simply referred to as particle sizes of 5 nm or more and less than 40 nm); a region of equal to or greater than 40 nm and less than 80 nm (simply referred to as particle sizes of 40 nm or more and less than 80 nm); and a region of equal to or greater than 80 nm and equal to or less than 120 nm (simply referred to as particle sizes of from 80 to 120 nm), in the entire particles having particle sizes of from 5 to 120 nm are calculated. Similarly, the ratios (% based volume) of the three regions of a region having particle sizes of equal to or greater than 10 nm and equal to or less than 30 nm; a region having particle sizes of equal to or greater than 45 nm and equal to or less than 75 nm; and a region having particle sizes of equal to or greater than 90 nm and equal to or less than 110 nm are also calculated.

In the present invention, the abrasives preferably satisfy the relationship between an average particle size (r) on the number basis and a standard deviation (σ) on the number basis of the formula (1):

$$\sigma \geq 0.3 \times r, \quad (1)$$

wherein r is an average particle size (nm) on the number basis and σ is a standard deviation (nm) of the number basis, more preferably satisfy the relationship of the formula (2):

$$\sigma \geq 0.34 \times r, \quad (2)$$

wherein r and σ are as defined above, even more preferably satisfy the relationship of the formula (3):

$$\sigma \geq 0.375 \times r, \quad (3)$$

wherein r and σ are as defined above, from the viewpoint of increasing the polishing rate.

Also, the abrasives preferably satisfy the relationship of the formula (4):

$$-0.2 \times r + 25 \geq \sigma \quad (4)$$

wherein r and σ are as defined above, more preferably satisfy the relationship of the formula (5):

$$-0.25 \times r + 25 \geq \sigma, \quad (5)$$

wherein r and σ are as defined above, from the viewpoint of reducing surface roughness.

Each of the average particle size (r) on the number basis and the standard deviation (σ) on the number basis of the above-mentioned abrasives can be obtained by considering the projected area diameter of individual abrasive particles for 1000 or more that obtained when determining the above-mentioned particle size distribution, as the diameter, and analyzing data using spreadsheet software "EXCEL" (commercially available from Microsoft Corporation).

Based on the data for the particle size distribution of the abrasive particles obtained by calculating the diameters of the particles into the volume of the particles using the above-mentioned spreadsheet software "EXCEL," a ratio of particles having a given particle size (% based volume) is expressed as a cumulative frequency counted from a small particle size side in the entire particles, and a cumulative volume frequency (%) is obtained. Based on the particle size and the data for the cumulative volume frequency of the abrasive particles obtained as mentioned above, a graph of particle size-cumulative volume frequency is obtained by plotting the cumulative volume frequency against the particle size.

In the present invention, the abrasives are preferably those having the particle size distribution so that the relationship between the particle size (R) and the cumulative volume frequency (V) within a range of particle sizes of from 60 to 120 nm in the above-mentioned graph of particle size-cumulative volume frequency satisfies the following formulas (6) and (7):

$$V \geq 0.5 \times R \quad (6)$$

$$V \leq 0.25 \times R + 75 \quad (7)$$

wherein R is a particle size (nm) of the abrasive and V is a cumulative volume frequency (%) of the abrasive counted from a small particle size side in the entire particles. Those having the particle size distribution wherein the cumulative volume frequency is 90% within a range of particle sizes of 105 nm or more are more preferable, from the viewpoint of reducing microwaviness of the surface of the substrate for a disk, thereby improving surface smoothness of the substrate.

In the present invention, the above-mentioned formula (1) is an index showing the spread of the particle size distribution of the abrasive particles. The abrasive particles having a particle size distribution within the specified range mean that the abrasive particles have a particle size distribution, the spread of which is a given level or more.

Also, in the present invention, the above-mentioned formulas (6) and (7) are indices each showing an existing ratio of the abrasive particles. The abrasive particles satisfying the above-mentioned formulas (6) and (7) within the range of particle size of from 60 to 120 nm mean that the abrasive particles contain those having a given particle size in a given ratio or more.

By using the abrasives satisfying these formulas of from (1) to (7), microwaviness can be reduced to a satisfactory level for practical use without impairing its productivity.

The abrasive usable in the present invention may be those composed of one kind of abrasives having a specified particle size distribution, or an admixture of two or more kinds of abrasives having different particle size distributions, as long as the abrasives have the particle size distributions as defined above. When two or more kinds of the abrasives are used, the particle size distribution of the abrasives refers to the particle size distribution of the mixed abrasives.

The abrasives are preferable those having particle size distribution so that the relationship of the cumulative volume frequency (V) and the particle size (R) in the graph of the above-mentioned particle size-cumulative volume frequency satisfies the formula (8):

$$V \geq 0.5 \times R + 40 \quad (8)$$

within a range of particle sizes of from 40 to 100 nm, more preferably those having a particle size distribution so that the relationship of V and R satisfies the formula (9):

$$V \geq 1 \times R + 20 \quad (9)$$

within a range of particle sizes of from 40 to 70 nm, even more preferably those having a particle size distribution so that the relationship of V and R satisfies the formula (10):

$$V \geq 1.5 \times R \quad (10)$$

within a range of particle sizes of from 40 to 60 nm, even more preferably those having a particle size distribution so that the relationship of V and R satisfies the formula (11):

$$V \geq 3 \times R - 60 \quad (11)$$

within a range of particle sizes of from 40 to 50 nm, even more preferably those having a particle size distribution so that the relationship of V and R satisfies the formula (12):

$$V \geq R + 50 \quad (12)$$

within a range of particle sizes of from 40 to 45 nm, from the viewpoint of reducing surface roughness (Ra) of the surface of the substrate, thereby improving surface smoothness of the surface of the substrate.

In addition, those having a particle size distribution so that the relationship of V and R satisfies the formula (13):

$$V \leq 8R+5 \quad (13)$$

within a range of particle sizes of from 1 to 3 nm, are preferable, from the viewpoint of increasing the polishing rate.

In the present specification, "the surface roughness (Ra)" refers to the surface roughness (TMS-Ra(Å)) of the object to be determined (hereinafter referred to as an object), which is determined with a light scattering-type surface roughness measuring machine "TMS-2000RC" (commercially available from Schmitt Measurement Systems, Inc.).

Additionally, in the above-mentioned graph of particle size-cumulative volume frequency, the abrasives are:
(a) those having particle size distribution so that the relationship of the cumulative volume frequency (V) and the particle size (R) satisfies the formula (14):

$$V \leq 2 \times (R-5) \quad (14)$$

within a range of particle sizes of from 5 to 40 nm, and
(b) those having particle size distribution so that the relationship of the cumulative volume frequency (V) and the particle size (R) satisfies the formula (15):

$$V \geq 0.5 \times (R-20) \quad (15)$$

within a range of particle sizes of from 20 to 40 nm, from the viewpoint of carrier squeals. Since the particle size distribution of the particles used as the abrasives satisfies the above-mentioned (a), the generation of the carrier squeals during the polishing step of the substrate for a disk can be suppressed. On the other hand, since the particle size distribution of the particles satisfies the above-mentioned (b), micropits can be effectively reduced, and a high polishing rate can be also obtained.

When the substrate for a disk is polished with a polishing machine, the substrate is loaded into a holder (carrier) set between polishing platens, in an eccentric position. With the progress of the polishing, the carrier squeals may be generated in the surroundings of the carrier in some cases. In general, the carrier squeals are seriously generated when polished with the polishing composition containing a large amount of abrasive particles having particle sizes of 40 nm or less. When the generation of carrier squeals is of a slight degree, a squeaking noise is generated intermittently or continuously, but when it is of a severe degree, the entire polishing machine starts to vibrate so that the polishing step has to be interrupted.

Additionally, in the present invention, the abrasives are preferably used in admixture of the abrasives having a particle size distribution satisfying the formula (16) (first component):

$$\sigma > 0.9067 \times r^{+0.588} \quad (16)$$

wherein r is an average particle size (nm) on the number basis, and σ is a standard deviation (nm) on the number basis, and other abrasives having a different average particle size and/or a different standard deviation from that of the first component (second component).

Here, the formula (16) shows the state of the particle size distribution of the abrasives, and the abrasives having the particle size distribution satisfying the formula (16) are in a state that the particle size distribution has comparatively wider distribution width (so-called as "a broad state") according to the average particle size. The standard deviation is preferably 30 or less, from the viewpoint of reducing surface roughness and scratches. In addition, it is more preferable that the particle size distribution satisfies:

$$\sigma > 0.71 \times r^{+0.7},$$

wherein σ and r are as defined above, even more preferably the particle size distribution satisfies:

$$\sigma > 0.57 \times r^{+0.8},$$

wherein σ and r are as defined above.

The abrasives of the second component may be abrasives having at least either one of the average particle size or the standard deviation different from that of the first component. Among them, the abrasives of the second component preferably differ by 10% or more, more preferably 20% or more, in the average particle size or the standard deviation, as compared to that of the abrasives of the first component, from the viewpoints of increasing the polishing rate and reducing surface roughness and microwaviness.

In addition, as the particle size distribution of the abrasives of the second component, the abrasives having the particle size distribution satisfying the above formula (16), preferably those having the particle size distribution satisfying the formula (17):

$$\sigma \leq 0.9067 \times r^{+0.588} \quad (17)$$

wherein σ and r are as defined above, from the viewpoints of increasing the polishing rate and reducing surface roughness and microwaviness.

Here, the abrasives having the particle size distribution satisfying the formula (17) is in a state of having a particle size distribution other than the formula (16), i.e., the particle size distribution is in a state that the particle size distribution has a relatively narrow distribution width (so-called as "in a state of sharp") corresponding to the average particle size. The standard deviation is preferably 1 or more, from the viewpoint of increasing the polishing rate.

Further, the abrasives may contain a third component. The abrasives of the third component may be in the broad state or in the sharp state as mentioned above. Also, the abrasives in a broad state and the abrasives in a sharp state may be used together.

The ratio of the abrasives of the first component to the abrasives of the second component (the first component : the second component, weight ratio) is preferably from 1:0.05 to 0.05:1, more preferably from 1:0.1 to 0.1:1, even more preferably from 1:0.2 to 0.2:1, even more preferably from 1:0.25 to 0.25:1, in the polishing composition, from the viewpoints of increasing the polishing rate and reducing surface roughness and microwaviness.

The content of the abrasives is preferably 0.5% by weight or more, more preferably 1% by weight or more, even more preferably 3% by weight or more, even more preferably 5% by weight or more, of the polishing composition, from the viewpoint of increasing the polishing rate, and the content is preferably 20% by weight or less, more preferably 15% by weigh or less, even more preferably 13% by weight or less, even more preferably 10% by weight or less, of the polishing composition, from the viewpoint of improving surface qualities and from the viewpoint of having economic advantages. Accordingly, the content is preferably from 0.5 to 20% by weight, more preferably from 1 to 15% by weight, even more preferably from 3 to 13% by weight, even more preferably from 5 to 10% by weight, of the polishing composition.

In addition, the polishing composition used in the present invention may further contain the oxidizing agents, from the viewpoints of increasing the polishing rate, and reducing surface roughness (Ra, Rmax) and microwaviness. The oxidizing agent includes the oxidizing agents described in "*Kagaku Dai Jiten* 3 (*Chemistry Enriched Dictionary*, Volume 3)," p.910 (published by Kyoritsu Shuppan). Among them, hydrogen peroxide, iron (III) nitrate, peracetic acid, ammonium peroxodisulfate, iron (III) sulfate and ammonium iron (III) sulfate are preferable. Hydrogen peroxide is even more preferable, from the viewpoints of not depositing metal ions to the surface of the substrate and being widely used and inexpensive. These oxidizing agents can be used alone or in admixture of two or more kinds.

The content of the oxidizing agent is preferably 0.002% by weight or more, more preferably 0.005% by weight or more, even more preferably 0.007% by weight or more, even more preferably 0.01% by weight or more, of the polishing composition, from the viewpoint of increasing the polishing rate. Also, the content is preferably 20% by weight or less, more preferably 15% by weight or less, even more preferably 10% by weight or less, even more preferably 5% by weight or less, of the polishing composition, from the viewpoints of reducing surface roughness and microwaviness, and reducing surface defects such as pits and scratches, thereby improving surface qualities, and from the viewpoint of economic advantages. The content is preferably from 0.002 to 20% by weight, more preferably from 0.005 to 15% by weight, even more preferably from 0.007 to 10% by weight, even more preferably from 0.01 to 5% by weight, of the polishing composition.

The above-mentioned polishing composition may contain an acid and/or a salt thereof, from the viewpoints of increasing the polishing rate, reducing surface roughness (Ra, Rmax), and reducing surface defects such as microwaviness and scratches. As the acid and/or salt thereof, those compounds of which acidic form has pK1 of 2 or less are preferable. The compound has a pK1 of preferably 1.5 or less, more preferably 1 or less, and even more preferably those having such strong acidity which cannot be expressed by pK1 are desirable, from the viewpoint of reducing microscratches. Examples thereof include acids described in *Kagaku Binran* (*Kiso-hen*) II, Fourth Revision, pp. 316–325 (Edit. by Nippon Kagakukai). Among them, an inorganic acid and an organophosphonic acid are preferable, from the viewpoint of reducing broad scratches. Among the inorganic acids, nitric acid, sulfuric acid, hydrochloric acid and perchloric acid are more preferable. Among organic phosphonic acids, 1-hydroxyethylidene-1,1-diphosphonic acid, aminotri (methylenephosphonic acid), ethylenediaminetetra(methylenephosphonic acid) and diethylenetriaminepenta(methylenephosphonic acid) are more preferable.

The salts of these acids are not particularly limited. Examples thereof include salts with a metal, ammonium, an alkylammonium, an organic amine or the like. Concrete examples of the metals include those metals belonging to the Group 1A, 1B, 2A, 2B, 3A, 3B, 4A, 6A, 7A or 8 of the Periodic Table (long period form). Among them, the salt with the metal belonging to Group 1A or with ammonium is preferable, from the viewpoint of reducing microscratches. These acids and the salts thereof may be used alone or in admixture of two or more kinds.

The content of the above-mentioned acid and the salt thereof is preferably from 0.0001 to 5% by weight, more preferably from 0.0003 to 3% by weight, even more preferably from 0.001 to 2% by weight, even more preferably from 0.0025 to 1% by weight, of the polishing composition, from the viewpoint of exhibiting satisfactory polishing rate and from the viewpoint of improving surface qualities.

Water in the polishing composition is used as a medium, and for instance, distilled water, ion exchanged water, ultrapure water or the like is used. The content is preferably from 55 to 99.4979% by weight, more preferably from 67 to 98.9947% by weight, even more preferably from 75 to 96.992% by weight, even more preferably from 84 to 94.9875% by weight, of the polishing composition, from the viewpoint of efficiently polishing the object to be polished.

The concentration of each component such as the abrasive, water, the oxidizing agent, and the acid, a salt thereof or a mixture thereof in the above-mentioned polishing composition may be any of the concentration during the preparation of the composition and the concentration upon use. In many cases, the polishing composition is usually prepared as a concentrate, which is diluted upon use.

Especially, in the present invention, in the case where the polishing composition comprises:

the above-mentioned abrasives, an oxidizing agent, an acid, a salt thereof or a mixture thereof, and water, there is further exhibited an effect that surface roughness of the polished object after polishing can be made smaller and projections or scratches can be remarkably reduced, also the polishing process can be effectively carried out, for final polishing of a memory hard disk or for polishing a semiconductor element, by polishing a substrate to be polished with the polishing composition and the polishing pad having a surface member having an average pore size of 1 to 35 µm.

Here, the scratches include two kinds of scratches, nano scratches and broad scratches. The term "nano scratches" refers to scratches of the order of nano size, which can be observed with "Micromax VMX-2100" (commercially available from VISION PSYTEC CO., LTD.) having a width of 0.5 µm or less and a depth of 3 nm or less, and the term "broad scratches" refers to broader scratches which can be observed with a differential interference optical microscope, having a width of from 10 to 50 µm and a depth of 5 nm or less.

Especially, in the present invention, since the polishing composition can be appropriately retained on the polishing pad with the polishing pad having the specified surface member as described above, there is exhibited an effect that the surface roughness of the polished object can be made small, and projections, scratches, especially nano scratches observed with Micromax or broad scratches having a very broad width of from 10 to 50 µm and a depth of 5 nm or less can be remarkably reduced while maintaining a high polishing rate, whereby high-quality memory hard disk and semiconductor element can be manufactured.

Also, the average particle size of primary particles of the abrasives is preferably 200 nm or less, more preferably 120 nm or less, even more preferably 80 nm or less, even more preferably 40 nm or less, from the viewpoint of reducing surface defects such as surface roughness (Ra, Rmax), microwaviness and scratches.

As the acid and/or salt thereof, those compounds of which acidic form has a pK1 of 2 or less are preferable, more preferably a pK1 of 1.5 or less, even more preferably 1 or less, even more preferably those having such a strong acidity to an extent that cannot be expressed by pK1, from the viewpoint of reducing broad scratches.

In addition, other component can be added to the polishing composition used in the present invention as occasion demands. The other component includes thickeners, dispersing agents, anticorrosive agents, basic substances, surfactants, and the like.

The polishing composition used in the present invention can be prepared by mixing the above-mentioned abrasive, oxidizing agent, acid and/or salt thereof, water and other components as occasion demands, and the like, by a known method.

When an acid other than the inorganic acid, especially an organophosphonic acid, is contained in the polishing composition usable in the present invention as an acid of which pK1 is 2 or less, the acid value (Y) of the polishing composition is preferably 20 mg KOH/g or less, more preferably 15 mg KOH/g or less, even more preferably 10 mg KOH/g or less, even more preferably 7 mg KOH/g or less, even more preferably 3 mg KOH/g or less, from the viewpoint of reducing broad scratches. When an inorganic acid is contained in the polishing composition usable in the present invention as an acid of which pK1 is 2 or less, the acid value (Y) of the polishing composition is preferably 5 mg KOH/g or less, more preferably 3 mg KOH/g or less, even more preferably 1.8 mg KOH/g or less, even more preferably 1.5 mg KOH/g or less, from the viewpoint of reducing broad scratches.

In addition, the acid value (Y) of the polishing composition is preferably 0.2 mg KOH/g or more, more preferably 0.5 mg KOH/g or more, even more preferably 0.75 mg KOH/g or more, even more preferably 1.0 mg KOH/g or more, from the viewpoint of increasing the polishing rate.

In other words, the acid value (Y) of the polishing composition is preferably from 0.2 to 20 mg KOH/g, from the viewpoints of reducing broad scratches and increasing polishing rate. Especially, when an acid other than the inorganic acid, especially an organophosphonic acid, is contained in the polishing composition usable in the present invention as an acid of which pK1 is 2 or less, the acid value (Y) of the polishing composition is more preferably from 0.5 to 20 mg KOH/g, even more preferably from 0.75 to 20 mg KOH/g, even more preferably from 1 to 20 mg KOH/g, even more preferably from 1 to 15 mg KOH/g. When an inorganic acid is contained in the polishing composition usable in the present invention as an acid of which pK1 is 2 or less, the acid value (Y) of the polishing composition is more preferably from 0.2 to 5 mg KOH/g, even more preferably from 0.5 to 5 mg KOH/g, even more preferably from 0.75 to 5 mg KOH/g, even more preferably from 1 to 5 mg KOH/g.

The acid value (Y) is determined by a method in accordance with JIS K 1557, and is obtained as an amount (mg) of potassium hydroxide required for neutralizing 1 g of a polishing composition.

In addition, it is preferable that the acid value (Y) of the polishing composition usable in the present invention satisfies the following formula (18):

$$Y(\text{mg KOH/g}) \leq 5.7 \times 10^{-17} \times X(\text{number/g}) + 19.45 \quad (18)$$

wherein X is a concentration of the abrasives on a number basis in the polishing composition, from the viewpoint of reducing broad scratches.

Broad scratches are surface defects which have not so far been remarked, and the present inventors have found that the generation of the broad scratches depends upon a balance between a degree of corrosiveness of the polishing composition and a degree of a direct contact of a polishing pad with a substrate to be polished, which is an object to be polished during polishing. Specifically, by using a polishing composition satisfying the relationship of the formula (18), wherein the degree of corrosiveness of the polishing composition is expressed as an acid value, and the degree of a direct contact of a polishing pad with a substrate to be polished, which is an object to be polished is expressed by a concentration of the abrasives on a number basis, the present inventors have found that broad scratches can be significantly reduced.

In the present invention, when the acid value (Y) of the polishing composition and the concentration of the abrasives on a number basis satisfy the relationship of the formula (18), effects such as a mechanical factor (direct contact of a polishing pad with a substrate to be polished, which is an object to be polished) and a chemical factor (corrosiveness) are well-balanced, so that broad scratches are significantly reduced are exhibited. Here, the formula (18) shows the relationship between a concentration (X) of the abrasives on a number basis, which is a mechanical factor, and an acid value (Y), which is a chemical factor. Therefore, the fact that this acid value (Y) is a value equal to or less than the value derived from a primary function of the concentration of the abrasives on the right-hand side of the formula means that the upper limit of the strength of the corrosiveness (acid value (Y)) which can remarkably reduce broad scratches is determined once the conditions for the direct contact of the polishing pad with the substrate to be polished, which is an object to be polished, at a given concentration (X) of the abrasives on a number basis are set.

Especially, by polishing a substrate with the polishing composition satisfying the relationship of the above-mentioned formula (18), effects such as three kinds of broad scratches which are further classified into three stages "L (large)," "M (medium)" and "S (small)" depending upon the depths of broad scratches as described in Examples set forth below can be reduced to a level that is not affected for practical purposes are exhibited.

Here, the concentration (X), expressed as number/g, of the abrasives on a number basis in the polishing composition is obtained by the following formula (19):

$$X = [(\% \text{ by weight of Abrasive})/100]/[(\text{True Specific Gravity of Abrasive}(g/cm^3)) \times (4/3)\pi \times (\text{Advanced Primary Particle Size}(cm)/2)^3] \quad (19)$$

As the true specific gravity of the abrasives, in the case where the abrasives are silica, for instance, the true specific gravity of an amorphous silica of 2.2 g/cm$^3$ as described in "The Chemistry of Silica" (Iler, Ralph K., 1979 John Wiley & Sons, Inc.). In a case where a literature value is not available, the true specific gravity can be obtained by an average primary particle size and an experimental value of a BET specific surface area according to BET method. In this case, the average primary particle size used can be obtained by analyzing the images observed with a transmission or scanning electron microscope (magnification: preferably from 3000 to 100000 times), and determining a particle size at 50% counted from a smaller particle size side of the primary particles in a cumulative particle size distribution on the number basis (D50).

The method for adjusting Y so as to satisfy the formula (18) includes, for instance, a method of preparing a polishing composition containing an acid of which upper limit of the amount is a value obtained by dividing the upper limit value of the acid value (Y), previously calculated from the concentration of the abrasives on number basis, by the weight of 1 mol of KOH, i.e. 56110 mg to convert its unit to [mol/g], multiplying the resultant conversion value with the molecular weight of the acid used (nitric acid or the like) to convert its unit to [% by weight]; and the like.

In addition, when the polishing composition contains an inorganic acid, a salt thereof or a mixture thereof, it is preferable that Y satisfies:

$$Y(\text{mg KOH/g}) \leq 5.7 \times 10^{-17} \times X(\text{number/g}) + 3.00,$$

more preferably Y satisfies:

$$Y(\text{mg KOH/g}) \leq 5.7 \times 10^{-17} \times X(\text{number/g}) + 1.77,$$

even more preferably Y satisfies:

$$Y(\text{mg KOH/g}) \leq 5.7 \times 10^{-17} \times X(\text{number/g}) + 1.67,$$

even more preferably Y satisfies:

$$Y(\text{mg KOH/g}) \leq 5.7 \times 10^{-17} \times X(\text{number/g}) + 1.47,$$

from the viewpoint of reducing broad scratches.

In addition, when the polishing composition contains an acid other than the inorganic acid, a salt thereof or a mixture thereof, especially an organophosphonic acid, a salt thereof or a mixture thereof, it is preferable that Y satisfies:

$$Y(\text{mg KOH/g}) \leq 5.7 \times 10^{-17} \times X(\text{number/g}) + 14.45,$$

more preferably Y satisfies:

$$Y(\text{mg KOH/g}) \leq 5.7 \times 10^{-17} \times X(\text{number/g}) + 9.45,$$

even more preferably Y satisfies:

$$Y(\text{mg KOH/g}) \leq 5.7 \times 10^{-17} \times X(\text{number/g}) + 6.45,$$

even more preferably Y satisfies:

$$Y(\text{mg KOH/g}) \leq 5.7 \times 10^{-17} \times X(\text{number/g}) + 2.45,$$

from the viewpoint of reducing broad scratches.

It is preferable that the pH of the polishing composition of the present invention is appropriately determined depending upon the kinds of the objects to be polished and the required properties. The pH of the polishing composition cannot be absolutely determined because it differs depending upon the materials of the substrate, which is an object to be polished. In a case where the object to be polished is a substrate for a precision part which is mainly made of a metal such as a nickel-phosphorus (Ni—P) plated aluminum alloy substrate, the pH is preferably from 1.0 to 4.5, more preferably from 1.2 to 4.0, even more preferably from 1.4 to 3.5, even more preferably from 1.6 to 3.0, of the polishing composition, from the viewpoint of increasing the polishing rate. The pH can be adjusted by properly adding an inorganic acid such as nitric acid or sulfuric acid, an organic acid such as oxalic acid, an ammonium salt thereof, or a basic substance such as aqueous ammonia, potassium hydroxide, sodium hydroxide or amine in a desired amount.

One embodiment for the method for manufacturing a substrate of the present invention includes a method including the step of polishing a substrate to be polished with the polishing composition of the present invention with the above-mentioned polishing pad. The polishing process for a substrate to be polished includes a polishing process including the step of polishing a substrate to be polished with the polishing composition of the present invention, or polishing a substrate to be polished with a polishing composition prepared by mixing each component so as to have the same composition as the polishing composition of the present invention with feeding the polishing composition to a polishing pad, and the polishing process can be even more preferably suitably used for the manufacture of a substrate for precision parts, even more preferably a substrate for memory hard disk. In addition, according to the above method, microwaviness and further scratches can be remarkably reduced, so that high polishing rate can be exhibited. Therefore, the present invention relates to a polishing process for a substrate and a method for reducing microwaviness or scratches for a substrate.

The conditions for the method for manufacturing a substrate is not particularly limited. The conditions may be such that, for instance, the flow rate of the polishing composition of preferably from 20 to 200 ml/min, more preferably from 30 to 150 ml/min, even more preferably from 40 to 130 ml/min, per one substrate from the viewpoint of reducing scratches.

In addition, the flow rate of the polishing composition of preferably 300 ml/min or less, more preferably 200 ml/min or less, even more preferably 150 mmin or less, even more preferably 130 ml/min or less, per one substrate from the viewpoints of reducing broad scratches and having economic advantages.

The material of a substrate to be polished, which is an object to be polished, by the polishing composition of the present invention includes, for instance, metals or metalloids such as silicon, aluminum, nickel, tungsten, copper, tantalum and titanium, and alloys thereof; glassy substances such as glass, glassy carbon and amorphous carbons; ceramic materials such as alumina, silicon dioxide, silicon nitride, tantalum nitride, and titanium carbide; resins such as polyimide resins; and the like. Among them, a substrate is preferably made of a metal such as aluminum, nickel, tungsten or copper, or made of an alloy containing these metals as the main components, or a substrate contains these metals, such as a semiconductive substrate such as a semiconductor element. For instance, an Ni—P plated aluminum alloy substrate and a glass substrate made of crystallized glass or reinforced glass are more preferable, and an Ni—P plated aluminum alloy substrate is even more preferable.

The shape of the substrate to be polished is not particularly limited. For instance, those having shapes containing planar portions such as discs, plates, slabs and prisms, or shapes containing curved portions such as lenses can be subjects for polishing with the polishing composition of the present invention. Among them, those having the disc-shaped substrates are even more preferable in polishing.

In addition, the pH of the wastewater after polishing is preferably 7 or less, more preferably 5 or less, even more preferably 2.5 or less, even more preferably 2.2 or less, from the viewpoint of reducing scratches.

According to the method for manufacturing a substrate of the present invention, effects such as a memory hard disk or semiconductor element in which the object to be polished after polishing has remarkably reduced microwaviness are exhibited.

Further, according to the method for manufacturing a substrate of the present invention, effects such as a memory hard disk or semiconductor element in which the polished object after polishing has remarkably reduced surface roughness, projections, and scratches such as nano scratches as observed with Micromax and broad scratches having a very wide width of from 10 to 50 $\mu$m and a depth of 5 nm or less are exhibited.

EXAMPLES

The following examples further describe and demonstrate embodiments of the present invention. The examples are given solely for the purposes of illustration and are not to be construed as limitations of the present invention.

(Object to Be Polished)

Each of the polishing compositions obtained in the following Examples and Comparative Examples was evaluated for its polishing properties by using an Ni—P plated, aluminum alloy substrate having a thickness of 1.27 mm, and a diameter of 95 mm, which was previously roughly polished with a polishing liquid containing alumina abrasives so that the substrate had a surface roughness (Ra) of 1 nm as an object to be polished.

(Polishing Pad)

Each of the polishing pads as shown in Table 1 were used by adjusting the pore diameter by carrying out the polishing treatment under the following conditions.
Polishing machine: double-sided processing machine, Model 9B-V, commercially available from SPEEDFAM CO., LTD.
Pressure: 4.4 kPa (45.4 g/cm$^2$)
Rotational speed of a lower platen: 32.5 r/min
Flow rate of water: 2000 liters/min
Dressing time period: 20 minutes
Pad dresser: "Pad dresser" (diamond particle size: #600), commercially available from A. L. M. T. Corp.

TABLE 1

| Polishing Pad | Before Treatment | | After Treatment | |
|---|---|---|---|---|
| | Manufacturer | Trade Name | Average Pore Size ($\mu$m) | Maximum Pore Size ($\mu$m) |
| A | FUJIBO | FK1N | 20.3 | 48.2 |
| B | Kanebo, LTD. | Bellatrix N0058 | 41.4 | 78.0 |

Examples I-1 to I-13 and Comparative Examples I-1 to I-6

There were added together the abrasive, hydrogen peroxide ($H_2O_2$), 1-hydroxyethylidene-1,1-diphosphonic acid (HEDP) and balance water (ion-exchanged water) each shown in Tables 2 and 3, with mixing, to give each of the polishing compositions having the composition as shown in Table 4. The order of adding is as follows: A 35% by weight aqueous hydrogen peroxide was added to an aqueous solution prepared by diluting HEDP in water, thereafter other components were added thereto, and an abrasive slurry was finally added to the mixture obtained with cautiously stirring not to cause gelation, to give a polishing composition. Next, each of the resulting polishing composition was used together with the polishing pad shown in Table 1, and the substrate to be polished was polished under the polishing conditions described below.

TABLE 2

| | | Content (vol %) | | | | | |
|---|---|---|---|---|---|---|---|
| Abrasive*) | Content (vol %) 5–120 nm | 5 nm– less than 40 nm | 40 nm– less than 80 nm | 80–120 nm | 10–30 nm | 45–75 nm | 90–110 nm |
| Syton 520 | 69.4 | 32.0% | 41.5% | 26.5% | 12.3% | 30.5% | 13.2% |
| Syton 524 | 100 | 99.0% | 1.0% | 0.0% | 81.6% | 0.0% | 0.0% |
| Syton 520/Syton 524(50/50) | 84.7 | 65.5% | 21.2% | 13.3% | 46.9% | 15.3% | 6.6% |
| Syton 520/Syton 524(30/70) | 90.8 | 78.9% | 13.1% | 8.0% | 60.8% | 9.2% | 4.0% |
| Syton 520/Syton 524(10/90) | 96.9 | 92.3% | 5.0% | 2.7% | 74.7% | 3.1% | 1.3% |
| Syton 524/Cataloid SI45P(50/50) | 100 | 49.8% | 50.2% | 0.0% | 40.8% | 45.2% | 0.0% |
| Cataloid SI30 | 100 | 100.0% | 0.0% | 0.0% | 99.2% | 0.0% | 0.0% |
| Cataloid SI45P | 100 | 0.6% | 99.4% | 0.0% | 0.0% | 90.5% | 0.0% |
| Cataloid SI30/Cataloid SI45P(20/80) | 100 | 20.5% | 79.5% | 0.0% | 19.9% | 72.4% | 0.0% |

*)In the table, each content inside the parenthesis is express by % by weight.

TABLE 3

| Abrasive*) | Average Particle Size (nm) | D90 (nm) | Standard Deviation (nm) | 0.3 × Average Particle Size (nm) | 0.9067 × (Average Particle Size)$^{+0.588}$ (nm) | Judgment of Broad/Sharp |
|---|---|---|---|---|---|---|
| Syton 520 | 22.6 | 195.1 | 15.8 | 6.8 | 5.7 | Broad |
| Syton 524 | 17.3 | 32.2 | 5.7 | 5.2 | 4.8 | Broad |
| Syton 520/Syton 524(50/50) | 20.4 | 156.8 | 12.2 | 6.1 | — | Broad/Broad |
| Syton 520/Syton 524(30/70) | 19.4 | 113.0 | 10.2 | 5.8 | — | Broad/Broad |
| Syton 520/Syton 524(10/90) | 18.3 | 36.8 | 7.5 | 5.5 | — | Broad/Broad |
| Syton 524/Cataloid SI45P(50/50) | 36.5 | 58.4 | 18.1 | 10.9 | — | Broad/Sharp |
| Cataloid SI30 | 14.5 | 16.3 | 2.6 | 4.3 | 4.4 | Sharp |
| Cataloid SI45P | 50.8 | 58.9 | 6.7 | 15.2 | 9.1 | Sharp |
| Cataloid SI30/Cataloid SI45P(20/80) | 20.7 | 60.4 | 15.0 | 6.2 | — | Sharp/Sharp |

*)In the table, each content inside the parenthesis is express by % by weight.

TABLE 4

| | Polishing Composition*) | | | | | |
|---|---|---|---|---|---|---|
| | Abrasive | | | | Oxidizing Agent | Acid and/or Salt Thereof |
| | Syton 520 | Syton 524 | Cataloid SI45P | Cataloid SI30 | $H_2O_2$ | HEDP |
| Ex. I-1 | 7.0 | | | | | |
| Ex. I-2 | 7.0 | | | | 0.6 | |
| Ex. I-3 | 7.0 | | | | | 2.0 |
| Ex. I-4 | | | 7.0 | | | |
| Ex. I-5 | | | 7.0 | | 0.6 | |
| Ex. I-6 | | | 7.0 | | | 2.0 |
| Ex. I-7 | | 7.0 | | | | 2.0 |
| Ex. I-8 | | | | 7.0 | | 2.0 |
| Ex. I-9 | 3.5 | 3.5 | | | | 2.0 |
| Ex. I-10 | 2.1 | 4.9 | | | | 2.0 |
| Ex. I-11 | 0.7 | 6.3 | | | | 2.0 |
| Ex. I-12 | | 3.5 | 3.5 | | | 2.0 |
| Ex. I-13 | | | 1.4 | 5.6 | | 2.0 |
| Comp. Ex. I-1 | 7.0 | | | | | |
| Comp. Ex. I-2 | 7.0 | | | | 0.6 | |
| Comp. Ex. I-3 | 7.0 | | | | | 2.0 |
| Comp. Ex. I-4 | | | 7.0 | | | |
| Comp. Ex. I-5 | | | 7.0 | | 0.6 | |
| Comp. Ex. I-6 | | | 7.0 | | | 2.0 |

*)In the table, each content is express by % by weight.

Incidentally, in Table 4,

HEDP represents 1-hydroxyethylidene-1,1-diphosphonic acid "Dequest 2010" (commercially available from SOLUTIA JAPAN INC.), and $H_2O_2$ represents a 35% by weight aqueous hydrogen peroxide (commercially available from ASAHI DENKA KOGYO K.K.).

The particle size distribution of the abrasive particle contained in the abrasive of the resulting polishing composition was obtained in accordance with the following method. The results are shown in FIG. 1.

(Method for Calculations of Average Particle Size and Standard Deviation)

An abrasive particle was observed with a transmission electron microscope "JEM-2000FX" commercially available from JEOL, LTD. (80 kV, magnification: 10000 to 50000 times) in accordance with the instruction manual attached by the manufacturer of the microscope, and its TEM image was photographed. Each of the photographs was incorporated into a personal computer as image data with a scanner connected thereto. The projected area diameter of individual abrasive particles was determined using an analysis software "WinROOF" (commercially available from MITANI CORPORATION), and considered as the diameter of abrasive particles. After analyzing data for 1000 or more abrasive particles, the average particle size ($\mu$m) and the standard deviation ($\sigma$) of the abrasive particles were calculated from the diameters of the abrasive particles based on the analyzed data using a spreadsheet software "EXCEL" (commercially available from Microsoft Corporation).

[Polishing Conditions]

Polishing testing machine: double-sided processing machine, Model 9B, commercially available from SPEEDFAM CO., LTD.

Rotational speed of a lower platen: 32.5 r/min

Feeding amount for a slurry: 40 ml/min

Processing pressure: 7.8 kPa

Number of substrates introduced: 10

[Method for Determination of Pore Size of Polishing Pad]

The surface of the polishing pad to be determined was enlarged 450 times with a digital microscope "VH-D8000" commercially available from KEYENCE (high magnification zoom lens "VH-Z450"), and the observed image was subjected to depth composition processing, and incorporated into a personal computer as image data with a scanner connected thereto. Next, the pore size was determined using an analysis software "WinROOF" (commercially available from MITANI CORPORATION). In a case where a pore has an oval shape, an average value of a long diameter and a short diameter is considered as a pore size, and the determinations were made on 100 or more pores, and an average pore size and a maximum value for the pore size were calculated.

The microwaviness of the surface of the resulting polished substrate was determined in accordance with the following methods. The results are shown in Table 5.

[Method for Determination of Micropits]

Figure 2:
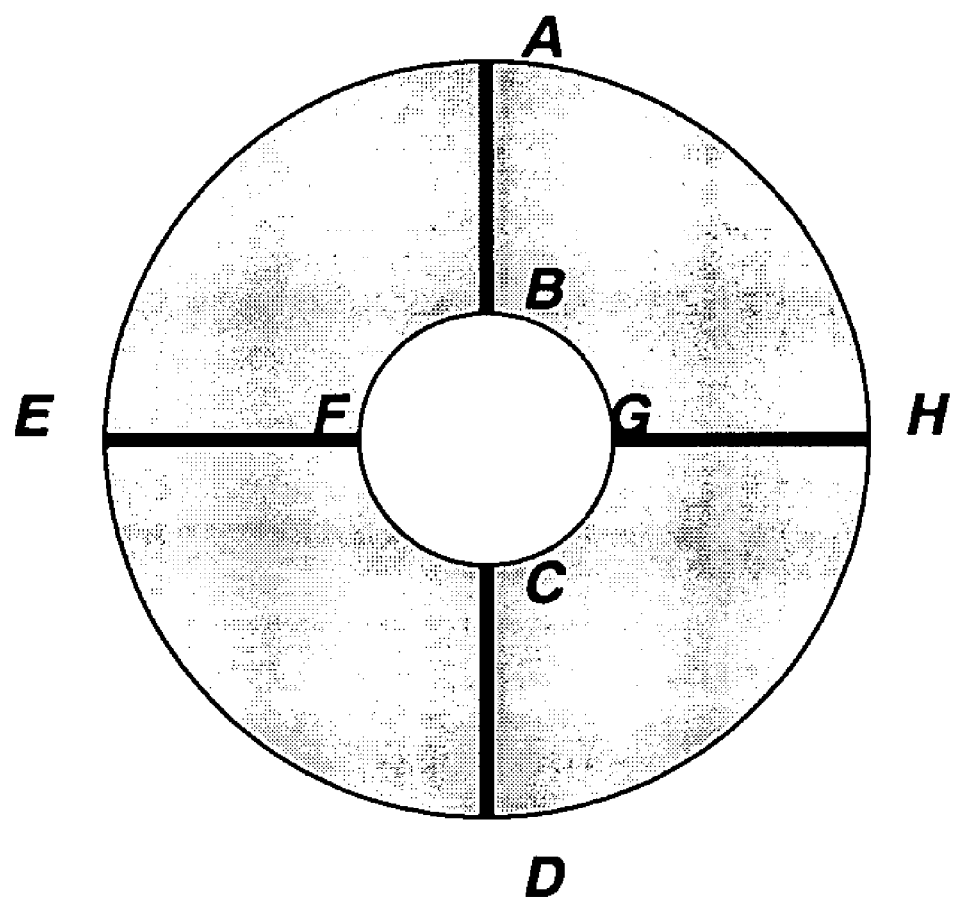
FIG. 2 is a schematic view showing the sites on the substrate scanned by a differential interference microscope in the determination of micropits.

Front and back sides of 5 substrates were observed with a differential interference microscopic system [metal microscope "BX60M" (commercially available from OLYMPUS CORPORATION), magnification: 50 times (eyepiece: 10 times, objective lens: 5 times)], and the number of micropits were counted, with scanning along line segments AB, CD, EF, GH as shown in FIG. 2.

[Determination of Microwaviness]

Each of the substrates to be determined were determined for short-wavelength waviness and long-wavelength waviness at two points of 180° intervals (total of 4 points) using "New-View 200" commercially available from Zygo under the conditions given below.

Object Lens: Magnification, 2.5 times, Michelson

Zooming Ratio: 0.5

Filter: Band Pass

Filter type: FFT Fixed

Wavelength Determined:

Short-Wavelength Waviness: Filter High Wavelength 0.05 mm
Filter Low Wavelength 0.50 mm
Long-Wavelength Waviness: Filter High Wavelength 0.50 mm
Filter Low Wavelength 5.00 mm

[Determination of Surface Roughness (TMS-Ra)]

The surface roughness (TMS-Ra) was determined with a light scattering-type surface roughness measuring machine "TMS-2000RC" (commercially available from Schmitt Measurement Systems, Inc.) in accordance with the instruction manual attached by the manufacturer of the measuring machine. Specifically, almost the entire region of the front and back sides of the substrate as the object to be polished was determined in a measuring spatial filtering wavelength of 0.88 to 7.8 μm, to give a value for the surface roughness (TMS-Ra) (Å).

[Judgment of Generation of Carrier Squeals]

During the period of from immediately after the start of the polishing to the end of polishing, the noise generated from the surrounding of the rotating platens (carrier) of the polishing test machine was evaluated in accordance with the following evaluation criteria in order to judge the presence or absence of the generation of the carrier squeals. ○ means that there is no generation of the carrier squeals; and Δ means that there is generation of the carrier squeals, respectively.

Evaluation Criteria

○: usual sliding noise during polishing being recognized; and

Δ: frictional noise of "squeak, squeak," not the above sliding noise being recognized.

Examples II-1 to II-8 and Comparative Examples II-1 to II-10

Each of the components of a commercially available abrasive colloidal silica (Silica A: "Silicadol 30G," commercially available from Nippon Chemical Industrial CO., LTD., or Silica B: "Syton 520," commercially available from Du Pont K.K.), a 35% by weight aqueous hydrogen peroxide (commercially available from ASAHI DENKA KOGYO K.K.), an aqueous 67.5% by weight nitric acid (commercially available from KANAME CHEMICALS CO., LTD.), an aqueous 60% by weight 1-hydroxyethylidene-1,1-diphosphonic acid (HEDP) "Dequest 2010 (trade name)" (commercially available from SOLUTIA JAPAN INC.) in given amounts, and balance ion-exchanged water, were added together and mixed, to give each of the polishing compositions shown in Table 6. The order of adding was as follows: Nitric acid or HEDP was added to an aqueous solution prepared by diluting the colloidal silica slurry with ion-exchanged water, and the aqueous hydrogen peroxide was finally added to the mixture obtained with cautiously stirring not to cause gelation, to give a polishing composition. Next, the above substrate was polished under the following conditions by combining each of the resulting polishing composition together with the polishing pad of Table 1 as shown in Table 6. The acid value of the polishing composition, the concentration of the abrasive on number basis, and the nano scratches and broad scratches of the substrate surface after polishing were determined and evaluated in accordance with the following methods. The results are also shown in Table 6.

TABLE 5

|  | Polishing Pad | Polishing Time (min) | Microwaviness | | Micropits (number/side) | TMS-Ra (Å) | Carrier Squeals |
|---|---|---|---|---|---|---|---|
|  |  |  | Short-Wavelength Waviness (nm) | Long-Wavelength Waviness (nm) |  |  |  |
| Ex. I-1 | A | 40 | 0.10 | 0.21 | 0.0 | 0.97 | ○ |
| Ex. I-2 | A | 30 | 0.09 | 0.20 | 0.0 | 0.96 | ○ |
| Ex. I-3 | A | 30 | 0.09 | 0.20 | 0.0 | 0.96 | ○ |
| Ex. I-4 | A | 40 | 0.11 | 0.22 | 25.0 | 0.89 | ○ |
| Ex. I-5 | A | 30 | 0.10 | 0.21 | 22.0 | 0.89 | ○ |
| Ex. I-6 | A | 30 | 0.10 | 0.21 | 20.0 | 0.89 | ○ |
| Ex. I-7 | A | 30 | 0.09 | 0.22 | 3.5 | 0.65 | Δ |
| Ex. I-8 | A | 30 | 0.11 | 0.22 | 4.1 | 0.57 | Δ |
| Ex. I-9 | A | 30 | 0.08 | 0.19 | 0.3 | 0.95 | ○ |
| Ex. I-10 | A | 30 | 0.08 | 0.19 | 0.7 | 0.92 | Δ |
| Ex. I-11 | A | 30 | 0.10 | 0.21 | 1.5 | 0.91 | Δ |
| Ex. I-12 | A | 30 | 0.10 | 0.22 | 12.3 | 0.71 | ○ |
| Ex. I-13 | A | 30 | 0.11 | 0.22 | 12.0 | 0.88 | ○ |
| Comp. Ex. I-1 | B | 40 | 0.19 | 0.27 | 0.0 | 0.99 | ○ |
| Comp. Ex. I-2 | B | 30 | 0.17 | 0.24 | 0.0 | 0.99 | ○ |
| Comp. Ex. I-3 | B | 30 | 0.17 | 0.24 | 0.0 | 0.98 | ○ |
| Comp. Ex. I-4 | B | 40 | 0.20 | 0.28 | 28.0 | 0.91 | ○ |
| Comp. Ex. I-5 | B | 30 | 0.18 | 0.26 | 25.0 | 0.90 | ○ |
| Comp. Ex. I-6 | B | 30 | 0.19 | 0.25 | 23.0 | 0.90 | ○ |

It can be seen from the results of Tables 4 and 5 that Examples I-1 to I-13 using polishing pads each having a surface member having an average pore size of from 0.1 to 35 μm can perform polishing in a shorter period of time reducing both short-wavelength waviness and long-wavelength waviness, as compared to those of Comparative Examples I-1 to I-6 using polishing pads each having a surface member having an average pore size of 41.4 μm.

[Polishing Conditions]

Polishing testing machine: double-sided processing machine, Model 9B-V, commercially available from SPEEDFAM CO., LTD.

Polishing pad: listed in Table 1

Rotational speed of a lower platen: 32.5 r/min.

Feeding amount for a polishing composition: 120 ml/min

Polishing time period: 4 min.

Processing pressure: 7.8 kPa
Number of substrates introduced: 10

(Determination of Acid Value)

In a 100 ml collection vial was accurately weighed about 50 g of each polishing composition with an electronic balance (BP221S, commercially available from Sartorius), and recorded to a fourth decimal place. Next, with stirring with a Teflon stirrer, the pH of the solution was determined with a pH meter "HM-30G" (commercially available from DKK TOA CORPORATION, electrode: GST-5721C) with 3-point calibration (pH=4.01 (25° C.: phthalate pH standard solution (commercially available from DKK TOA CORPORATION)), pH=6.86 (25° C.: neutral phosphate pH standard solution (commercially available from DKK TOA CORPORATION)), pH=9.18 (25° C.: borate pH standard solution (commercially available from KATAYAMA CHEMICAL, Inc.)). Thereto was added dropwise a 0.1 mol/L aqueous potassium hydroxide (factor 1.000; commercially available from Sigma Aldrich, Japan) using a 10 ml titration tube, and the amount (ml) of the aqueous potassium hydroxide showing a pH of 7.00 was determined (usually calculated by interpolation from four data points around pH 7.00). The amount (ml) of the aqueous potassium hydroxide required for neutralizing 1 g of the polishing composition was calculated from the amount (g) of the polishing composition and the amount of the aqueous potassium hydroxide required for neutralizing the polishing composition, and this is defined as an acid value (mg KOH/g). Here, in the table, the calculated value for the right-hand side of the equation (18) refers to a value obtained by substituting the concentration of the obtained abrasive on the number basis described later into a primary function of the right-hand side of the equation (18).

(Calculation of Concentration of Abrasive on Number Basis)

The concentration of the abrasive was calculated by substituting a specific gravity of an amorphous silica of 2.2 g/cm$^3$ into the equation (19).

(Method for Determination of Broad Scratches)

Front and back sides of 10 substrates to be polished were observed with a differential interference microscopic system [metal microscope "BX60M" (commercially available from OLYMPUS CORPORATION), objective lens: UMPlan FI 5×/0.15 BD P, CCD Color Camera: ICD-500AC (commercially available from IKEGAMI TSUSHINKI CO., LTD.), Color Monitor: UCM-1000 REV. 8 (commercially available from IKEGAMI TSUSHINKI CO., LTD.)], and the number of substrates out of 10 substrates in which broad scratches (depth: 0.1 nm or more and less than 5 nm, width: 10 μm or more and less than 50 μm, length: 10 μm or more and less than 1 mm) were generated were classified into L/M/S and counted. Here, the evaluation criteria for L(large), M(medium) and S(small) are as follows.

"L": (depth) 1.0 nm or more and less than 5.0 nm, (width) 10 μm or more and less than 50 μm, (length) 10 μm or more and less than 1 mm;

"M": (depth) 0.5 nm or more and less than 1.0 nm, (width) 10 μm or more and less than 50 μm, (length) 10 μm or more and less than 1 mm; and "S": (depth) 0.1 nm or more and less than 0.5 nm, (width) 10 μm or more and less than 50 μm, (length) 10 μm or more and less than 1 mm.

(Method for Determination of Nano Scratches)

The substrate intended to be determined was enlarged with "Micromax VMX-2100CSP" (commercially available from VISION PSYTEC CO., LTD.) (two 250 W metal halide light sources, one 180 W metal halide light source)so that its circumference was enlarged 26.6 times, and the number of scratches were counted. The determinations were made on both sides of five substrates, a total of 10 sides, and the number per side was obtained.

(Method for Calculations of Average Particle Size and Standard Deviation)

An abrasive particle was observed with a transmission electron microscope "JEM-20000FX" commercially available from JEOL, LTD. (80 kV, magnification: 10000 to 50000 times) in accordance with the instruction manual attached by the manufacturer of the microscope, and its TEM image was photographed. Each of the photographs was incorporated into a personal computer as image data with a scanner connected thereto. The projected area diameter of individual abrasive particles was determined using an analysis software "WinROOF" (commercially available from MITANI CORPORATION), and considered as the diameter of abrasive particles. After analyzing data for 1000 or more abrasive particles, the average particle size (μm) and the standard deviation (σ) of the abrasive particles were calculated from the diameters of the abrasive particles based on the analyzed data using a spreadsheet software "EXCEL" (commercially available from Microsoft Corporation).

TABLE 6

| | Polishing Composition | | | | | | | | |
|---|---|---|---|---|---|---|---|---|---|
| | | Abrasive | | | Acid and/or Salt Thereof | | | | |
| | Pad | Silica A (%) | Silica B (%) | Oxidizing Agent $H_2O_2$ (%) | Nitric Acid (%) | HEDP (%) | Acid Value (mg KOH/g) | pH | pH of Wastewater | D50 (nm) |
| Ex. II-1 | A | 7 | | 1 | 0.12 | | 0.6 | 2.0 | 3.5 | 50 |
| Ex. II-2 | A | 7 | | 1 | 0.16 | | 1.4 | 1.9 | 2.5 | 50 |
| Ex. II-3 | A | 7 | | 1 | 0.2 | | 1.8 | 1.8 | 2.1 | 50 |
| Ex. II-4 | A | 7 | | 1 | 0.3 | | 2.6 | 1.5 | 1.9 | 50 |
| Ex. II-5 | A | | 9 | 1 | | 0.42 | 2.5 | 2.2 | 3.0 | 20 |
| Ex. II-6 | A | | 9 | 1 | | 1 | 6.6 | 1.8 | 2.2 | 20 |
| Ex. II-7 | A | | 9 | 1 | | 2 | 13.4 | 1.5 | 1.9 | 20 |
| Ex. II-8 | A | | 9 | 1 | | 3 | 19.9 | 1.3 | 1.7 | 20 |
| Comp. Ex. II-1 | B | 7 | | | | | 0.0 | 10.0 | 9.5 | 50 |
| Comp. Ex. II-2 | B | 7 | | 1 | 0.12 | | 0.6 | 2.0 | 3.5 | 50 |
| Comp. Ex. II-3 | B | 7 | | 1 | 0.16 | | 1.4 | 1.9 | 2.5 | 50 |
| Comp. Ex. II-4 | B | 7 | | 1 | 0.2 | | 1.8 | 1.8 | 2.1 | 50 |

TABLE 6-continued

| | | | | | | | | | |
|---|---|---|---|---|---|---|---|---|---|
| Comp. Ex. II-5 | B | 7 | | 1 | 0.3 | | 2.6 | 1.5 | 1.9 | 50 |
| Comp. Ex. II-6 | B | 9 | | | | | 0.0 | 10.0 | 9.5 | 20 |
| Comp. Ex. II-7 | B | 9 | | 1 | | 0.42 | 2.5 | 2.2 | 3.0 | 20 |
| Comp. Ex. II-8 | B | 9 | | 1 | | 1 | 6.6 | 1.8 | 2.2 | 20 |
| Comp. Ex. II-9 | B | 9 | | 1 | | 2 | 13.4 | 1.5 | 1.9 | 20 |
| Comp. Ex. II-10 | B | 9 | | 1 | | 3 | 19.9 | 1.3 | 1.7 | 20 |

| | Concentration of Abrasive on Number Basis ($\times 10^{14}$/g) | Calculated Value on Right-Hand Side of Equation (18) (mg KOH/g) | Polishing Rate ($\mu$m/minute) | Broad Scratches (L/M/S) | Nano Scratches (Number/Side) |
|---|---|---|---|---|---|
| Ex. II-1 | 4.9 | 19.5 | 0.05 | (0/0/0) | 16 |
| Ex. II-2 | 4.9 | 19.5 | 0.05 | (0/0/0) | 15 |
| Ex. II-3 | 4.9 | 19.5 | 0.05 | (0/0/1) | 13 |
| Ex. II-4 | 4.9 | 19.5 | 0.07 | (0/0/10) | 11 |
| Ex. II-5 | 97.7 | 20 | 0.08 | (0/0/0) | 9 |
| Ex. II-6 | 97.7 | 20 | 0.11 | (0/0/1) | 6 |
| Ex. II-7 | 97.7 | 20 | 0.13 | (0/0/5) | 4 |
| Ex. II-8 | 97.7 | 20 | 0.14 | (0/0/10) | 4 |
| Comp. Ex. II-1 | 4.9 | 19.5 | 0.02 | (0/0/0) | 100< |
| Comp. Ex. II-2 | 4.9 | 19.5 | 0.05 | (0/0/0) | 50 |
| Comp. Ex. II-3 | 4.9 | 19.5 | 0.05 | (0/0/0) | 42 |
| Comp. Ex. II-4 | 4.9 | 19.5 | 0.05 | (0/0/1) | 36 |
| Comp. Ex. II-5 | 4.9 | 19.5 | 0.07 | (0/0/10) | 31 |
| Comp. Ex. II-6 | 97.7 | 20 | 0.02 | (0/0/0) | 100< |
| Comp. Ex. II-7 | 97.7 | 20 | 0.08 | (0/0/0) | 25 |
| Comp. Ex. II-8 | 97.7 | 20 | 0.11 | (0/0/1) | 23 |
| Comp. Ex. II-9 | 97.7 | 20 | 0.13 | (0/0/5) | 21 |
| Comp. Ex. II-10 | 97.7 | 20 | 0.14 | (0/0/10) | 20 |

Silica A: Silicadol 30G (commercially available from Nippon Chemical Industrial CO., LTD.)
Silica B: Syton 520 (commercially available from Du Pont K. K.)
pK1: HEDP: 1.7, nitric acid: 1 or less It can be seen from the results of Table 6 that in Examples II-1 to II-8 using the polishing pad having a surface member having an average pore size of 1 to 35 $\mu$m, polishing can be carried out in which both of nano scratches and broad scratches are reduced, as compared to those of Comparative Examples II-1 to II-10 using the polishing pad having a surface member having an average pore size of 41.4 $\mu$m. Also, all of the substrates obtained in Examples II-1 to II-10 had reduced surface roughness with notably reduced projections.

According to the method for manufacturing a substrate of the present invention, effects such as a memory hard disk or a semiconductor element with remarkably reduced microwaviness of the polished object can be manufactured are exhibited. Further, according to the method for manufacturing a substrate of the present invention, effects such as a memory hard disk or a semiconductor element in which nano scratches and broad scratches of the polished object can be manufactured are exhibited.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a substrate comprising the step of polishing a substrate to be polished with a polishing composition comprising an abrasive and water with a polishing pad of which surface member has an average pore size of from 1 to 35 $\mu$m, wherein the abrasive comprises particles having particle sizes of from 5 to 120 nm in an amount of 50% by volume or more of the entire amount of the abrasive, wherein the abrasive comprises:

(i) 10 to 100% by volume of small size particles having particle sizes of from 5 nm or more and less than 40 nm based on an entire amount of the abrasive particles having particle sizes of from 5 to 120 nm;
(ii) 0 to 70% by volume of intermediate size particles having particle sizes of from 40 nm or more and less than 80 nm based on an entire amount of the abrasive particles having particle sizes of from 5 to 120 nm; and
(iii) 0 to 40% by volume of large size particles having particle sizes of from 80 to 120 nm based on an entire amount of the abrasive particles having particle sizes of from 5 to 120 nm.

2. The method according to claim 1, wherein the abrasive is made of silica.

3. The method according to claim 1, wherein the polishing composition further comprises an oxidizing agent.

4. The method according to claim 3, wherein the polishing composition further comprises an acid, a salt thereof or a mixture thereof.

5. The method according to claim 4, wherein the acid has a pK1 of 2 or less.

6. The method according to claim 4, wherein the polishing pad is made from suede.

7. The method according to claim 6, wherein the polishing composition has an acid value of from 0.2 to 20 mg KOH/g.

8. The method according to claim 3, wherein the polishing pad is made from suede.

9. The method according to claim 1, wherein the polishing composition further comprises an acid, a salt thereof or a mixture thereof.

10. The method according to claim 9, wherein the polishing pad is made from suede.

11. A method for manufacturing a substrate comprising the step of polishing a substrate to be polished with a polishing composition comprising an abrasive and water with a polishing pad of which surface member has an average pore size of from 1 to 35 μm, wherein the polishing composition further comprises an acid having a pK1 of 2 or less, a salt therof or a mixture thereof.

12. The method according to claim 11, wherein the polishing composition further comprises an oxidizing agent.

13. A method for manufacturing a substrate comprising the step of polishing a substrate to be polished with a polishing composition comprising an abrasive and water with a polishing pad of which surface member has an average pore size of from 1 to 35 μm, and wherein the polishing pad is made from suede.

14. The method according to claim 13, wherein the polishing composition further comprises an oxidizing agent.

15. The method according to claim 14, wherein the polishing composition further comprises an acid, a salt thereof or mixtures thereof.

16. The method according to claim 15, wherein the polishing composition has an acid value of from 0.2 to 20 mg KOH/g.

17. The method according to claim 13, wherein the polishing composition further comprises an acid, a salt thereof or a mixture thereof.

18. A polishing process for a substrate, comprising the step of polishing a substrate to be polished with a polishing composition comprising an abrasive and water with a polishing pad of which surface member has an average pore size of from 1 to 35 μm, wherein the polishing composition further comprises an acid having a pK1 of 2 or less, a salt thereof or a mixture thereof.

19. The polishing process according to claim 18, wherein the polishing composition further comprises an oxidizing agent.

20. A method of reducing microwaviness for a substrate, comprising the step of polishing a substrate to be polished with a polishing composition comprising an abrasive and water with a polishing pad of which surface member has an average pore size of from 1 to 35 μm, wherein the polishing composition further comprises an acid having a pK1 of 2 or less, a salt thereof or a mixture thereof.

21. A method of reducing scratches for a substrate, comprising the step of polishing a substrate to be polished with a polishing composition comprising:
    an abrasive,
    an oxidizing agent,
    an acid having a pK1 of 2 or less, a salt thereof or a mixture thereof, and
    water,
with a polishing pad of which surface member has an average pore size of from 1 to 35 μm.

* * * * *